(12) United States Patent
Bruhnke

(10) Patent No.: US 6,451,071 B1
(45) Date of Patent: Sep. 17, 2002

(54) COLORANTS MADE FROM REACTIVE DYES AND FATTY AMINES

(75) Inventor: John D. Bruhnke, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/535,773

(22) Filed: Mar. 28, 2000

Related U.S. Application Data

(62) Division of application No. 09/212,175, filed on Dec. 15, 1998, now Pat. No. 6,287,348.

(51) Int. Cl.$^7$ .................. C09B 62/002; D06P 3/00; D06P 1/38

(52) U.S. Cl. .............. 8/543; 8/602; 8/544; 8/546; 8/547; 8/548; 8/549; 8/654; 8/655; 8/657; 8/658; 8/659; 8/661; 8/662; 8/675; 8/677; 8/685; 8/686

(58) Field of Search ............... 8/543, 544, 546, 8/547, 548, 549, 602, 654, 655, 657, 658, 659, 661, 662, 675, 677, 685, 686, 521, 513, 580, 617

(56) References Cited

U.S. PATENT DOCUMENTS

| 5,606,356 A | * | 2/1997 | Noguchi et al. | 347/100 |
| 5,733,363 A | * | 3/1998 | Nagashima et al. | 106/31.43 |
| 5,785,745 A | * | 7/1998 | Lauw et al. | 106/31.27 |

FOREIGN PATENT DOCUMENTS

| DE | 2648535 | * | 5/1977 |

* cited by examiner

Primary Examiner—John Hardee
(74) Attorney, Agent, or Firm—Terry T. Moyer; William S. Parks

(57) ABSTRACT

This invention relates to colorants comprising organic chromophores, in particular reactive dyes, which comprise electrophilic reactive groups, and which are also covalently bonded to fatty amine moieties through amino linking groups. Such colorants provide excellent colorability and long-term stability, both within (or on) colored substrates and upon long-term storage. Such colorants exhibit particularly good coloring and stability within hydrocarbon compositions, such as fuels, mineral oil, and the like, and wax compositions, including candles, crayons, and the like. Methods of making such colorants as well as methods of coloring hydrocarbon and wax compositions are also contemplated within this invention.

6 Claims, No Drawings

COLORANTS MADE FROM REACTIVE DYES AND FATTY AMINES

CROSS REFERENCE TO RELATED APPLICATIONS

This application is a divisional of application Ser. No. 09/212,175, filed on Dec. 15, 1998, now U.S. Pat. No. 6,287,348. This parent application is herein entirely incorporated by reference.

FIELD OF THE INVENTION

This invention relates to colorants comprising organic chromophores, in particular reactive dyes, which comprise electrophilic reactive groups, and which are also covalently bonded to fatty amine moieties through amino linking groups. Such chemically modified colorants provide excellent colorability, particularly within hydrocarbon compositions, such as fuels, mineral oil, and the like, and wax compositions, including candles, crayons, and the like. Methods of making such colorants as well as methods of coloring hydrocarbon and wax compositions are also contemplated within this invention.

DISCUSSION OF THE PRIOR ART

All U.S. patents cited within this specification are hereby incorporated by reference.

Reactive dyes generally provide effective and desirable colorations to different substrates and within different media. However, such dyes cannot color substrates and media in which they are not soluble. For example, standard reactive dyes do not exhibit any solubility within hydrocarbons, such as fuels, oils, and the like, or waxes, such as paraffin, beeswax, and the like. Thus, some type modification of reactive dyes is needed initially to provide such required solubility and ultimately to permit desirable colorations within hydrocarbons and waxes.

There are no prior teachings which disclose such modifications to reactive dyes to increase the solubility of such reactive dyes within hydrocarbon and wax media. There are previous disclosures regarding the addition of polyoxyalkylene chains to reactive dyes, including U.S. Pat. No. 4,634,555, to Baxter et al., U.S. Pat. No. 4,703,113, to Baxter et al., U.S. Pat. No. 4,726,844, to Greenwood et al., U.S. Pat. No. 4,738721, to Baxter et al., U.S. Pat. No 4,777,248, to Baxter et al., as well as EP-A 0176195, to Baxter et al ., and EP-A 0187520, to Greenwood. Each of these patents is assigned to Imperial Chemical Incorporated (ICI) and merely teaches the addition of polyoxyalkylene chains to reactive dyes for further introduction within printing ink formulations. Furthermore, again there is no discussion within these references about the modification of the reactive dye backbone to improve solubility within hydrocarbons or waxes. Thus, a need remains for facilitating the introduction of reactive dyes within hydrocarbons and waxes in order to obtain desired colorations of such media since the prior art has not accorded such an improvement to that industry.

DESCRIPTION OF THE INVENTION

It is thus an object of the invention to provide modified reactive dyes which exhibit high degrees of solubility and excellent colorability within hydrocarbon compositions and wax formulations. A further object of the invention is to provide a relatively inexpensive, improved, stable colorant based on reactive dye technology which improves the versatility of such desirable colorants. Yet another object of this invention is to provide a process for making such modified reactive dyes, as well as methods of using such improved colorants.

The present invention provides fatty amine-substituted reactive dye as colorants which are compatible with polar solvents, such as water and methanol. Furthermore, the inventive colorants are readily soluble, if in particulate form, or miscible, if in liquid form, with hydrocarbons and waxes. Such solubility and miscibility provide a distinct advantage over traditional reactive dyes which are generally highly insoluble in such media. Thus, the inventive colorants can be utilized in applications where standard reactive dyes were inoperable in the past. The inventive colorants can be utilized over a wide pH range and are compatible with fragrances and preservatives, as merely examples, without complexing or destabilizing the resultant mixture. These colorants are also compatible with most cationic, anionic, non-ionic, and quaternary systems. Lastly, since the inventive colorants produce true solutions and not emulsions nor dispersions, the formulations made therefrom are homogeneous, clear, and brilliant in appearance.

Accordingly, this invention includes a colorant compound as defined by the formula (I)

$$A\text{—}B\text{—}X; \quad (I)$$

wherein, A–B is a reactive dye, wherein A is an organic chromophore, B is an electrophilic reactive group covalently bonded to A directly or through a linking group, and X is a fatty amine covalently linked to B through an amino linkage. Preferably X is a primary or secondary, branched or linear $C_{12}$–$C_{24}$ alkylamine or $C_{12}$–$C_{24}$ etheramine, most preferably a $C_{18}$–$C_{22}$ alkylamines or $C_{18}$–$C_{22}$ etheramine. The group A is a chromophore such as azo, phthalocyanine, anthraquinone, aza[18]annulene, formazan copper complex, triphenodioxazine, nitroso, nitro, diarylmethane, triarylmethane, xanthene, acridene, methine, thiazole, indamine, azine, oxazine, thiazine, quinoline, indigoid, indophenol, lactone, aminoketone, hydroxyketone, and stilbene. The group B is an electrophilic functional group such as monohalotriazole, dihalotriazole, monohalopyrimidine, dihalopyrimidine, trihalopyrimidine, dihaloquinoxaline, dihalopyrazone, dihalophthalazine, halobenzothiazole, mono-(m-carboxypyridinium)-triazine, amino epoxide, methylamino, sulfatoethyl sulfone, sulfatoethyl sulfonamide, chloroethyl sulfone, vinyl sulfone, phenylamino sulfone, acrylamide, alpha-haloacryloylamide, alpha, beta-dihalopropionyl amide, halosulfonyl pyrimidine, sulfatoethylamino sulfone, sulfatopropionamide, halosulfatothiazinylamide, and haloacetylamide. Preferably A is azo, phthalocyanine, or anthraquinone and B is monochlorotriazine, monofluorotriazine, dichlorotriazine, sulfatoethyl sulfone, vinyl sulfone, 2,3-dichloroquinoxaline, or 2,4-difluor-5-chloropyrimidine. For example, the reactive dye formed by the combination of A and B (A–B as noted above) can be C.I. Reactive Black 5, C.I. Reactive Blue 2, C.I. Reactive Blue 4, C.I. Reactive Blue 7, C.I. Reactive Blue 9, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, or C.I. Reactive Yellow 95.

The term hydrocarbon is intended to encompass any organic composition comprised primarily of carbon and hydrogen in which reactive dyes are substantially insoluble.

More specifically, hydrocarbon is intended to encompass fuels (such as kerosene), mineral spirits, oils, diluents, solvents, and any other such hydrogen and carbon-containing organic compositions in which unmodified reactive dyes are substantially insoluble.

The term wax is intended to encompass any wax or wax-like substance in which unmodified reactive dyes are substantially insoluble. Waxes are generally defined as esters of high-molecular weight fatty acid with a high molecular weight alcohol or mixtures of any such esters. More specific types of such waxes include mineral waxes, such as paraffin, montan, ozokerite, microcrystalline, earth, , and the like; animal waxes, such as beeswax, waspwax, Chinesewax (insectwax), and the like; vegetable waxes, such as camauba, sugarcane wax, candelilla, flax wax, and the like; and synthetic waxes, such as Fischer-Tropsch wax, polyethylene wax, and the like. Wax compositions can be molded into different articles such as candles and crayons (with the addition of sufficient amounts of suitable plasticizers, such as stearic acid), ear plugs, and the like. The colorants are generally added in proportions of from about 0.005 to about 15.0% by weight of the wax media, preferably from about 0.01 to about 10.0%, more preferably from about 0.05 to about 5.0%, and most preferably from about 0.1 to about 3.0%.

Prior to utilization in any coloring method, the inventive colorants may be diluted with any suitable solvent. Such solvents include butyl carbitol, kerosene, prisorene, and the like. As a result, such solvents are initially colored, added to the molten wax medium, and dispersed throughout the wax thereby producing a thoroughly colored article upon cooling. Generally, the colorants are diluted to ratios of colorant to diluent from about 1:0.1 to about 1:100, with a more preferable ratio being from about 1:0.5 to about 1:20, and a most preferable range of from about 1:1 to about 1:10.

Any other standard reactive dye composition additives, such as resins, preservatives, hydrocarbon or wax colorants other than the inventive modified reactive dyes, pigments, surfactants, and antistatic compounds may also be incorporated within the inventive hydrocarbon and wax composition or utilized within the inventive method.

DESCRIPTION OF THE PREFERRED EMBODIMENT

The general method of making the preferred inventive colorant is as follows:

One equivalent of reactive dyestuff was mixed with about 1 to about 4 molar equivalents of amine, one equivalent of sodium carbonate (or other suitable acid scavenger), and a sufficient amount of butyl carbitol to permit thorough mixing of the resultant solution. The reaction mixture is then heated to between about 80 and 100° C. for from 2 to about 4 hours. The resultant colorant was then washed with sufficient amounts of water to remove any excess salts. Such a removal is not necessary, but, in certain situations, unwanted salts may deleteriously affect the coloring capability of the inventive fatty amine reactive dyes. The resultant colorant may then be diluted with a suitable diluent, such as butyl carbitol, kerosene, prisorene, and the like, in preparation for introduction within or on certain desired substrates. Any reactive dye and primary or secondary, linear or branched, alky- or ether-amine can be utilized within this general procedure.

The specific formulations below, as well as the following exemplified methods of coloring are thus indicative of the preferred embodiments of this invention:

EXAMPLE 1

10 grams of C.I. Reactive Blue 19 (75%) was mixed with 8.8 grams of PA-16 (branched $C_{12}H_{25}$—O—$CH_2CH_2CH_2NH_2$, available from Tomah Products, Inc., Milton Wis.), 1.4 grams of sodium carbonate, and 30 grams of butyl carbitol. The mixture was heated at 85° C. for two hours thereby producing a concentrated liquid polymeric colorant which could be utilized without any further modifications.

EXAMPLE 2

10 grams of C.I. Reactive Blue 19 (75%) was mixed with 12.6 grams of PA-2220 ($C_{18}H_{37}/C_{16}H_{33}$—O—$CH_2CH_2CH_2NH_2$, available from Tomah Products, Inc., Milton Wis.), 1.4 g of sodium carbonate, and 40 grams of butyl carbitol. The mixture was heated at 85° C. for two hours thereby producing a concentrated liquid polymeric colorant which could be utilized without any further modifications.

EXAMPLE 3

10 grams of C.I. Reactive Blue 19 (75%) was mixed with 7.2 grams of Adogen® 160D (Coco, $C_{12-14}$—$NH_2$, available from Sherex Chemical Co., Dublin, Ohio.), 1.4 grams of sodium carbonate, and 30 grams of butyl carbitol. The mixture was heated at 85° C. for two hours thereby producing a concentrated liquid polymeric colorant which could be utilized without any further modifications.

EXAMPLE 4

10 grams of C.I. Reactive Blue 19 (75%) was mixed with 10.9 grams of Adogen® 101 ($C_{20-22}$—$NH_2$, available from Sherex Chemical Co., Dublin, Ohio), 1.4 grams of sodium carbonate, and 40 grams of butyl carbitol. The mixture was heated at 85° C. for two hours thereby producing a concentrated liquid polymeric colorant which could be utilized without any further modifications.

EXAMPLE 5

10 grams of C.I. Reactive Red 2 (50%) was mixed with 7.9 grams of PA-16, 1.7 grams of sodium carbonate, and 30 grams of butyl carbitol. The mixture was heated at 85° C. for two hours thereby producing a concentrated liquid polymeric colorant which could be utilized without any further modifications.

EXAMPLE 6

10 grams of C.I. Reactive Red 2 (50%) was mixed with 11.4 grams of PA-2220, 1.7 grams of sodium carbonate, and 30 grams of butyl carbitol. The mixture was heated at 85° C. for two hours thereby producing a concentrated liquid polymeric colorant which could be utilized without any further modifications.

EXAMPLE 7

10 grams of C.I. Reactive Red 2 (50%) was mixed with 11.4 grams of Adogen® 160D, 1.5 grams of sodium carbonate, and 30 grams of butyl carbitol. The mixture was heated at 85° C. for two hours thereby producing a concentrated liquid polymeric colorant which could be utilized without any further modifications.

EXAMPLE 8

10 grams of C.I. Reactive Red 2 (50%) was mixed with 9.3 grams of Adogen® 101, 1.5 grams of sodium carbonate, and 40 grams of butyl carbitol. The mixture was heated at 85° C. for two hours thereby producing a concentrated liquid polymeric colorant which could be utilized without any further modifications.

EXAMPLE 9

10 grams of C.I. Reactive Yellow 3 (50%) was mixed with 8.3 grams of PA-2220, 0.8 grams of sodium carbonate, and 30 grams of butyl carbitol. The mixture was heated at 85° C. for two hours thereby producing a concentrated liquid polymeric colorant which could be utilized without any further modifications.

EXAMPLE 10

10 grams of C.I. Reactive Red 2 (50%) was mixed with 9.3 grams of Adogen® 101, 1.5 grams of sodium carbonate, and 40 grams of butyl carbitol. The mixture was heated at 85° C. for two hours thereby producing a concentrated liquid polymeric colorant which could be utilized without any further modifications.

These colorants were then introduced within and hydrocarbon and wax media and evaluated for their individual coloring, migratory, and stability characteristics. The general methods followed were as follows:

Hydrocarbon Compositions

The colorant (or blend of colorants) was added to the hydrocarbon and stirred until the entire solution became a homogeneously colored formulation.

EXAMPLE 11

The colorant of EXAMPLE 5 was added to kerosene in an amount of about 0.01% by weight and stirred until the composition became an homogeneous shade of light red.

EXAMPLE 12

The colorant of EXAMPLE 5 was added to kerosene in an amount of about 0.3% by weight and stirred until the composition became an homogeneous shade of dark red.

Wax Compositions

The colorant (or blend of colorants) was added to molten wax and stirred (while the solution remained in a molten state) until the wax solution became an homogeneously colored formulation. This was allowed to cool and form a colored solid.

EXAMPLE 13

The colorant of EXAMPLE 6 was added to molten paraffin wax (melting point from 130–150° F.) in an amount of about 0.01% by weight and stirred until the molten wax became an homogeneous shade of light red. The colored molten wax was then poured into a mold (a nalgene beaker) and allowed to cool.

EXAMPLE 14

The colorant of EXAMPLE 6 was added to molten paraffin wax (melting point from 130–150° F.) in an amount of about 0.3% by weight and stirred until the molten wax became an homogeneous shade of light red. The colored molten wax was then poured into a mold (a nalgene beaker) and allowed to cool.

There are, of course, many alternative embodiments and modifications of the present invention which are intended to be included within the spirit and scope of the following claims.

What I claim is:

1. A composition comprising
   a solvent selected from the group consisting of a wax and a hydrocarbon; and
   a colorant compound substantially soluble therein said solvent and defined by the formula (I)

$$A\text{---}B\text{---}X; \qquad (I)$$

wherein,
   A—B is a reactive dye wherein
      A is an organic chromophore; and
      B is an electrophilic reactive group covalently bonded to A directly or through a linking group; and
   X is selected from the group consisting of primary and secondary amines, wherein said amines are selected from the group consisting of a $C_{12}$–$C_{24}$ alkylamine and a $C_{12}$–$C_{24}$ monoetheramine, wherein said group is covalently linked to B through an amino linkage.

2. The composition of claim 1 wherein said solvent is a wax.

3. The composition of claim 2 wherein
   X is selected from the group consisting of $C_{18}$–$C_{22}$ alkylamines and $C_{18}$–$C_{22}$ etheramines.

4. The composition of claim 1 wherein said solvent is a hydrocarbon.

5. The composition of claim 4 wherein
   X is selected from the group consisting of $C_{18}$–$C_{22}$ alkylamines and $C_{18}$–$C_{22}$ etheramines.

6. The composition of claim 1 wherein X is selected from the group consisting of a $C_{18}$–$C_{22}$ alkylamine and a $C_{18}$-$C_{22}$ monoetheramine.

\* \* \* \* \*